United States Patent
Sawaguchi

(10) Patent No.: US 9,137,150 B2
(45) Date of Patent: Sep. 15, 2015

(54) CHASSIS TYPE SWITCH

(71) Applicant: Hitachi Cable, Ltd., Tokyo (JP)

(72) Inventor: Chikara Sawaguchi, Tsukuba (JP)

(73) Assignee: HITACHI METALS, LTD., Tokyo (JP)

( * ) Notice: Subject to any disclaimer, the term of this patent is extended or adjusted under 35 U.S.C. 154(b) by 147 days.

(21) Appl. No.: 13/863,245

(22) Filed: Apr. 15, 2013

(65) Prior Publication Data

US 2013/0272113 A1 Oct. 17, 2013

(30) Foreign Application Priority Data

Apr. 16, 2012 (JP) .................................. 2012-93103

(51) Int. Cl.
*H04L 12/26* (2006.01)
*H04L 12/703* (2013.01)
*H04L 12/939* (2013.01)
*H04L 12/931* (2013.01)

(52) U.S. Cl.
CPC .............. *H04L 45/28* (2013.01); *H04L 49/557* (2013.01); *H04L 49/40* (2013.01)

(58) Field of Classification Search
None
See application file for complete search history.

(56) References Cited

U.S. PATENT DOCUMENTS

| | | | |
|---|---|---|---|
| 6,992,978 B1 * | 1/2006 | Humblet et al. ............... | 370/228 |
| 8,255,575 B2 | 8/2012 | Sakurai | |
| 8,270,412 B2 | 9/2012 | Aoshima | |
| 2008/0126536 A1 | 5/2008 | Sakurai | |
| 2009/0109861 A1 * | 4/2009 | Kini et al. ...................... | 370/242 |
| 2010/0284416 A1 | 11/2010 | Aoshima | |
| 2010/0290469 A1 * | 11/2010 | Assarpour ...................... | 370/392 |
| 2011/0019679 A1 | 1/2011 | Akahane et al. | |
| 2012/0002670 A1 * | 1/2012 | Subramanian et al. ........ | 370/389 |
| 2012/0008633 A1 * | 1/2012 | Kuramoto et al. ............. | 370/401 |
| 2012/0075988 A1 * | 3/2012 | Lu et al. ......................... | 370/218 |
| 2012/0320734 A1 | 12/2012 | Sakurai | |
| 2013/0028072 A1 * | 1/2013 | Addanki ......................... | 370/218 |

FOREIGN PATENT DOCUMENTS

| | | |
|---|---|---|
| JP | 2008-136013 A | 6/2008 |
| JP | 2009-105540 A | 5/2009 |
| JP | 2010-263395 A | 11/2010 |
| JP | 2011-29829 A | 2/2011 |
| JP | 2011-049958 A | 3/2011 |
| JP | 2011-130155 A | 6/2011 |

OTHER PUBLICATIONS

Japanese Office Action dated Feb. 17, 2015 with an English Translation.

* cited by examiner

*Primary Examiner* — Hassan Phillips
*Assistant Examiner* — Duc Duong
(74) *Attorney, Agent, or Firm* — McGinn IP Law Group, PLLC

(57) ABSTRACT

A chassis type switch is provided which can shorten a time required for switching-over to a backup route when a failure has occurred in a line card. In a chassis type switch including a plurality of line cards within a chassis, the switch further includes a failure detection unit for detecting a failure in each of the plural line cards, and a forced flooding processing unit included in each of the plural line cards and operating such that when, in trying to transfer a received unicast frame to another line card, a failure is detected in the relevant line card at a transfer destination, the received unicast frame is forcibly transferred to all ports of the own line card other than a reception port thereof and to all other line cards.

3 Claims, 3 Drawing Sheets

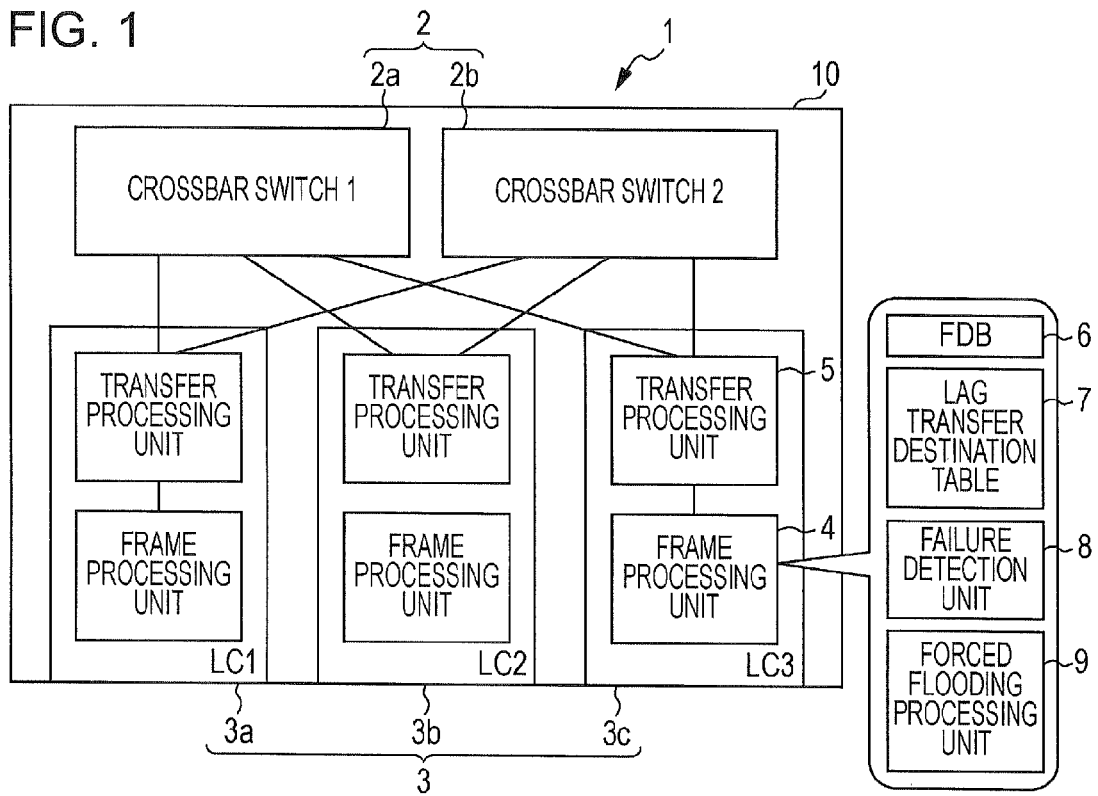
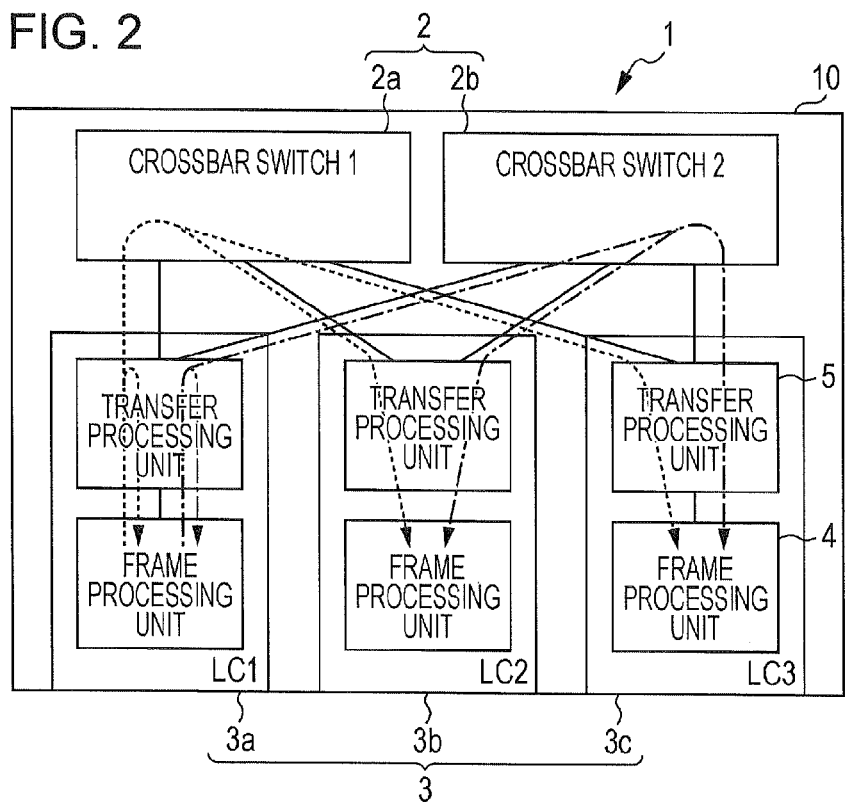

CHASSIS TYPE SWITCH

The present application is based on Japanese patent application No. 2012-93103 filed on Apr. 16, 2012, the entire contents of which are incorporated herein by reference.

BACKGROUND OF THE INVENTION

1. Field of the Invention

The present invention relates to a chassis type switch including a plurality of line cards within a chassis (casing).

2. Description of the Related Art

A chassis type switch is known which includes a plurality of line cards within a chassis.

There is a chassis type switch of the type including an FDB (Forwarding Database) installed in each of the line cards, and executing frame transfer among the line cards in accordance with the FDB. The term "FDB" implies a database for defining correspondence between a destination MAC (Media Access Control) address and an output port (i.e., an identifier of a line card and an identifier of the output port at a transfer destination, or an identifier of an LAG (Link Aggregation Group)). The term "LAG" implies a technique of bundling a plurality of transmission lines together and virtually handling the bundled transmission lines as one transmission line. Plural ports set in the LAG are collectively handled as one port.

In the chassis type switch, when a unicast frame is received, the line card having received the unicast frame refers to the FDB, which is installed therein, and extracts the identifier of the line card and the identifier of the output port (or the identifier of the LAG) at the transfer destination corresponding to the destination MAC address of the received frame. The relevant line card then transfers the frame to the extracted transfer destination. When the destination MAC address of the received frame is not registered in the FDB, a process of setting the relevant frame to be a destination unknown frame ("unknown") and transferring the destination unknown frame to all ports of the relevant line card other than a reception port thereof and to all other line cards is executed (such a process is called "flooding").

In the chassis type switch, if a failure or another trouble occurs in any line card within the device, the unicast frame to be transferred to the line card having caused the failure is not normally relayed and communication is interrupted. It is therefore desired that, if a failure has occurred in any line card, switching-over to a backup route is performed in a time as short as possible.

In the related-art chassis type switch, if the occurrence of a failure in the line card within the device is detected, each FDB entry corresponding to the line card in which the failure has been detected is erased with software (such an erasing process is called "FDB flush"). When the FDB flush is executed, the unicast frame is subjected to the flooding as the destination unknown frame, and switching-over to the backup route is performed.

There are following patent documents as related-art information with regard to the invention of this application.

Japanese Unexamined Patent Application Publication No. 2010-263395

Japanese Unexamined Patent Application Publication No. 2008-136013

Japanese Unexamined Patent Application Publication No. 2011-29829

In the related-art chassis type switch described above, however, a problem arises in that about several hundreds milliseconds (ms) are taken from the detection of the failure of the line card to the switching-over of the route, and that the communication is interrupted for a very long time. The reason will be described in detail below.

Let here consider the case where, as illustrated in FIG. 4A, in a ring network 41 constituted by four network relays 42a to 42d, including the related-art chassis type switch denoted by 42a, which are successively connected counterclockwise in the ring form, a unicast frame is transmitted from a terminal 43a (MAC address of 01:0a), which is connected to the chassis type switch 42a, to a terminal 43b (MAC address of 01:0b), which is connected to the network relay 42c. It is here assumed that the terminal 43a is connected to a port 10 of a tenth line card in the chassis type switch 42a, and that an LAG 10 set for a first line card in the chassis type switch 42a is connected to the network relay 42b. Furthermore, it is assumed that a port of the network relay 42d, which port is connected to the network relay 42c, is set to a blocking state of inhibiting transmission and reception of a frame.

When the unicast frame destined for the terminal 43b from the terminal 43a is received by the tenth line card in the chassis type switch 42a, the tenth line card refers to an FDS 44 installed therein, and extracts a transfer destination (LAG 10) corresponding to the destination MAC address (01: 0b) of the received frame. Because the LAG 10 is set in the first line card in this case, the unicast frame received by the tenth line card is transferred from the tenth line card to the first line card, and is transmitted from any one of ports of the first line card for which the LAG 10 is set. The frame transmitted from the first line card in the chassis type switch 42a reaches the terminal 43b through the network relays 42b and 42c.

Suppose here that, as illustrated in FIG. 4B, a failure has occurred in the first line card in the chassis type switch 42a. In the related-art chassis type switch 42a, the failure of the line card is detected by a management card (not illustrated) within the chassis type switch 42a, and the management card executes, for example, the FDB flush in each of the line cards by transmitting a control frame to all the line cards in order to erase each FDB entry corresponding to the line card in which the failure has been detected (the control frame is not transmitted depending on the type of system). The communication between both the terminals 43a and 43b is interrupted until the end of the FDB flush.

Upon the end of the FDB flush, the unicast frame destined for the terminal 43b is determined by the tenth line card to be "Destination Unknown" and is subjected to the flooding. As a result, the relevant unicast frame is transferred to the network relay 42d, whereby the route is switched over.

Thus, in the related-art chassis type switch 42a, after the failure of the line card has been detected by the management card, it is required to erase corresponding FDB entries in all the line cards with software by communicating the control frame between the management card and each line card. In addition, the operation of erasing the FDB entries takes a time in itself. Consequently, several hundreds milliseconds (ms) are taken from the detection of the failure of the line card to the switching-over of the route (even in the system not transmitting the control frame, a time is required to erase the FDB entries and several hundreds milliseconds (ms) are also taken from the detection of the failure of the line card to the switching-over of the route). The time from the detection of the failure of the line card to the switching-over of the route is desirably as short as possible because the communication between both the terminals 43a and 43b is interrupted during that time.

SUMMARY OF THE INVENTION

The present invention has been accomplished in view of the above-described situation in the art, and an object of the present invention is to provide a chassis type switch capable of shortening a time required for switching-over to a backup route when a failure has occurred in a line card.

To achieve the above object, the present invention provides a chassis type switch including a plurality of line cards within a chassis, the switch further including a failure detection unit for detecting a failure in each of the plural line cards, and a forced flooding processing unit included in each of the plural line cards and operating such that when, in trying to transfer a received unicast frame to another line card, a failure is detected in the relevant line card at a transfer destination, the received unicast frame is forcibly transferred to all ports of the own line card other than a reception port thereof and to all other line cards.

The chassis type switch may further include a frame processing unit included in each of the plural line cards and assigning an intra-device transfer header, including a frame type and an identifier of the line card at the transfer destination, to the received unicast frame, and a transfer processing unit included in each of the plural line cards, transferring the relevant frame to only the line card at the transfer destination when the frame type in the intra-device transfer header is a unicast frame, and transferring the relevant frame to all ports of the own line card other than a reception port thereof and to all other line cards when the frame type in the intra-device transfer header is a destination unknown frame. In that case, when a failure is detected in the line card at the transfer destination of the received unicast frame, the forced flooding processing unit may forcibly change the frame type in the intra-device transfer header, which is assigned to the received unicast frame, to the destination unknown frame, thereby forcibly transferring the received unicast frame to all the ports of the own line card other than the reception port thereof and to all the other line cards.

The failure detection unit may be included in each of the plural line cards such that the plural line cards mutually periodically transmit and receive a connectivity confirmation frame among the line cards, and that when the connectivity confirmation frame is not received from a certain line card for a predetermined time, the failure detection unit determines that a failure has occurred in the relevant line card.

When an LAG (link aggregation group) is set over a plurality of line cards and when a failure is detected in any of the plural line cards for which the LAG is set, the failure detection unit may regard the occurrence of the failure in any line card as implying that failures have been detected in all of the plural line cards for which the LAG is set.

According to the present invention, a time required for switching-over to a backup route when a failure has occurred in the line card can be shortened.

BRIEF DESCRIPTION OF THE DRAWINGS

FIG. 1 is a block diagram of a chassis type switch according to one embodiment of the present invention.

FIG. 2 illustrates routes of a connectivity confirmation frame in the chassis type switch of FIG. 1.

DESCRIPTION OF THE PREFERRED EMBODIMENTS

Figure 3A:
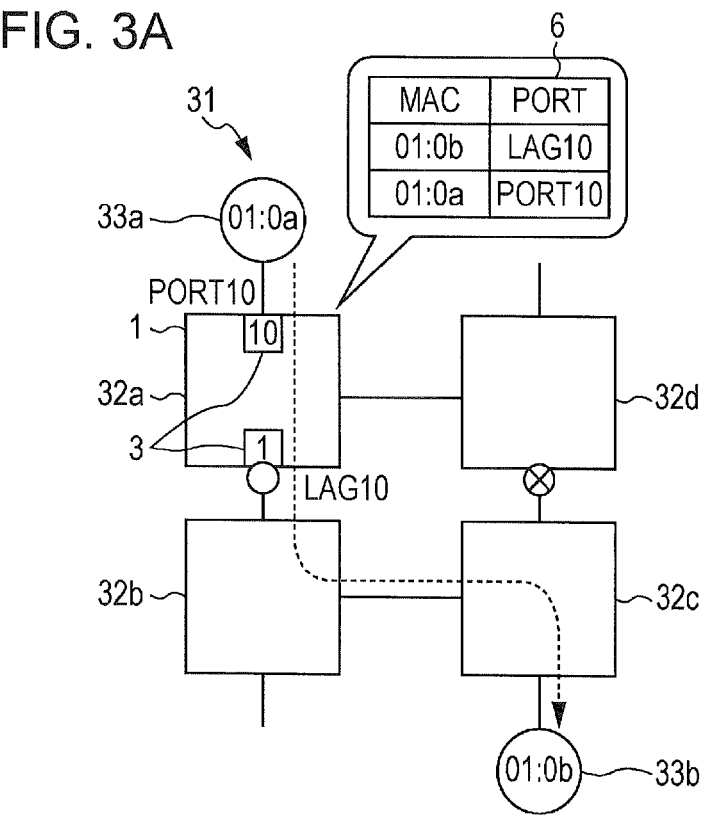
FIGS. 3A and 3B are each a block diagram to explain the operation when the chassis type switch of FIG. 1 is applied to a ring network.

An embodiment of the present invention will be described below with reference to the accompanying drawings.

FIG. 1 is a block diagram of a chassis type switch according to the embodiment.

As illustrated in FIG. 1, a chassis type switch 1 includes a plurality of line cards 3 within a chassis 10. While FIG. 1 illustrates the case including three line cards 3a to 3c (LC1, LC2 and LC3), the number of line cards 3 is not limited to three. The chassis type switch 1 is applied to, for example, a ring network.

The line cards 3 are interconnected within the device (i.e., the chassis type switch) via a crossbar switch 2 serving as a relay route. While FIG. 1 illustrates the case where each line card 3 includes two crossbar switches 2a and 2b (denoted respectively by a crossbar switch 1 and a crossbar switch 2 in FIG. 1) for redundancy of the relay route, the number of crossbar switches 2 is not limited to two.

Each line card 3 includes a frame processing unit 4 and a transfer processing unit 5.

The frame processing unit 4 refers to an FDB 6 and extracts an identifier of the line card 3 and an identifier of an output port (or an identifier of an LAG) at a transfer destination that corresponds to a destination MAC address of the received frame. Based on information of the extracted transfer destination, the frame processing unit 4 assigns, to the received frame, an intra-device transfer header including the type of the frame and the respective identifiers of the line card 3 and the output port at the transfer destination, and then outputs the frame to the transfer processing unit 5.

The term "type of the frame" used herein is to identify, for example, whether the relevant frame is a unicast frame, a destination unknown frame, or a broadcast frame. As one example, the received frame is determined to be a unicast frame if the destination MAC address of the received frame is registered in the FDB 6, a destination unknown frame if the destination MAC address of the received frame is not registered in the FDB 6, and a broadcast frame if the destination MAC address of the received frame is a broadcast address.

In the embodiment, the frame processing unit 4 further includes an LAG transfer destination table 7 to be adaptable for the LAG. The LAG transfer destination table 7 is a database for defining correspondence between a distributed ID and the respective identifiers of the line card 3 and the output port at the transfer destination. The LAG transfer destination table 7 is set for each LAG. When the transfer destination extracted by referring to the FDB 6 is the LAG, the frame processing unit 4 refers to the LAG transfer destination table 7 set for the relevant LAG, and extracts the identifier of the line card 3 and the identifier of the output port at the transfer destination corresponding to the distributed ID that is set in a predetermined manner. While various manners (so-called distribution rules) are proposed to determine from which one of ports set in the LAG the relevant frame is to be output, the distribution rule is not limited to the manner using the LAG transfer destination table 7 and the distributed ID, and the output port may be determined by any other suitable manner.

In addition, the frame processing unit 4 is designed to perform learning of the FDB 6 by correlating a transmission source MAC address of the received frame and a port having received the relevant frame with each other. Because a learning method of the FDB 6 is well known, the description thereof is omitted here.

The transfer processing unit 5 executes a frame transfer process in accordance with the intra-device transfer header that has been assigned by the frame processing unit 4. When the type of the frame in the intra-device transfer header is the unicast frame, the transfer processing unit 5 transfers the relevant frame to only the line card 3 at the transfer destination, and when the type of the frame in the intra-device transfer header is the destination unknown frame, it transfers the relevant frame to all ports of the own line card 3 other than a reception port thereof and to all other line cards 3 (though being limited to only ports having the same VLAN setting), (thus causing the flooding of the relevant frame).

The chassis type switch 1 according to the embodiment further includes a failure detection unit 8 and a forced flooding processing unit 9.

The failure detection unit 8 detects a failure of the line card 3. Herein, the failure of the line card 3 implies a state where a failure occurs in communication between the line cards 3, and it involves not only the case where a failure occurs in the line card 3, but also the case where a failure occurs in a relay route, etc.

In the embodiment, the failure detection unit 8 is included in each of the plural line cards 3, and it operates such that the line cards 3 mutually periodically transmit and receive a connectivity confirmation frame, and that when the connectivity confirmation frame is not received from a certain line card 3 for a predetermined time, the failure detection unit 8 determines that a failure has occurred in the relevant line card 3. With the constitution described above, if a failure has occurred in a certain line card 3, all the line cards 3 can detect the information regarding the occurrence of the failure in the relevant line card, thus enabling the failure information to be shared among the line cards 3. The failure detection unit 8 and the forced flooding processing unit 9 are both included in the frame processing unit 4.

In the embodiment, the failure detection unit 8 transmits the connectivity confirmation frame at a transmission cycle of 1000 pps (i.e., once per 1 ms). Accordingly, the connectivity confirmation frame can be transmitted and received at very short intervals between the frame processing units 4 of the line cards 3 via the transfer processing units 5 and the crossbar switch 2, whereby the detection of a failure of the line card 3 (including confirmation of integrity of the relay route) can be performed very quickly. In the embodiment, if the connectivity confirmation frame is not received from a certain line card 3 for 3.5 ms (3.5 times the transmission cycle of the connectivity confirmation frame), it is determined that a failure has occurred in the relevant line card 3.

FIG. 2 illustrates, as one example, routes of the connectivity confirmation frame transmitted from the frame processing unit 4 of the line card 3a (LC1) on the left side in the drawing. As illustrated in FIG. 2, because the embodiment includes two crossbar switches 2, the connectivity confirmation frame is transmitted through a route (denoted by dotted lines) passing through the crossbar switch 2a on the left side in the drawing, and through a route (denoted by one-dot-chain lines) passing through the crossbar switch 2b on the right side in the drawing.

The forced flooding processing unit 9 is included in each of the plural line cards 3, and it operates such that when, in trying to transfer the received unicast frame to another line card 3, a failure is detected in the relevant line card 3 at a transfer destination, the received unicast frame is forcibly transferred to all ports of the own line card 3 other than a reception port thereof and to all other line cards 3 (i.e., the received unicast frame is forcibly subjected to the flooding).

In more detail, if a failure is detected in the line card 3 at the transfer destination of the received unicast frame, the forced flooding processing unit 9 operates to forcibly change the type of the frame in the intra-device transfer header, which is assigned to the received unicast frame, to the destination unknown frame. Accordingly, the unicast frame destined for the failed line card 3 at the transfer destination is handled by the transfer processing unit 5 as the destination unknown frame and is subjected to the flooding. As a result, the switching-over to the backup route is performed. Because the change of the type of the frame in the intra-device transfer header by the forced flooding processing unit 9 is executed with a hardware process, the switching-over to the backup route is momentarily performed after the detection of the failure of the line card 3.

The operation of the chassis type switch 1 according to the embodiment when it is applied to the ring network will be described below with reference to FIGS. 3A and 3B.

Let here consider the case where, as illustrated in FIG. 3A, in a ring network 31 constituted by four network relays 32a to 32d that are successively connected counterclockwise in the ring form, the chassis type switch 1 according to the present invention is used as the network relay 32a, and a unicast frame is transmitted from a terminal 33a (MAC address of 01:0a), which is connected to the chassis type switch 1 (i.e., the network relay 32a), to a terminal 33b (MAC address of 01:0b), which is connected to the network relay 32c.

It is here assumed that the terminal 33a is connected to a port 10 of a tenth line card 3 in the chassis type switch 1, and an LAG 10 set for a first line card 3 in the chassis type switch 1 is connected to the network relay 32b. Furthermore, it is assumed that a port of the network relay 32d, which port is connected to the network relay 32c, is set to a blocking state of inhibiting transmission and reception of a frame.

When the unicast frame destined for the terminal 33b from the terminal 33a is received by the tenth line card 3 in the chassis type switch 1, the frame processing unit 4 of the tenth line card 3 refers to the FDB 6 installed therein, and extracts a transfer destination (LAG 10) corresponding to the destination MAC address (01: 0b) of the received frame. Because the transfer destination is the LAG in this case, the frame processing unit 4 further refers to the LAG transfer destination table 7 and extracts the identifier ("first" in this case) of the line card 3 and the identifier of the output port at the transfer destination.

The frame processing unit 4 assigns an intra-device transfer header, including not only the type of the frame ("unicast frame" in this case), but also the identifier ("first" in this case) of the line card 3 and the identifier of the output port at the transfer destination, to the received frame, and then outputs the received frame to the transfer processing unit 5. At that time, the forced flooding processing unit 9 does not execute any processing because a failure is not detected in the first line card 3 at the transfer destination.

With the type of the input frame being the unicast frame, the transfer processing unit 5 transfers the relevant frame to only the first line card 3 at the transfer destination. The frame transferred to the first line card 3 is transmitted from the output port that is designated in the intra-device transfer header, and it reaches the terminal 33b through the network relays 32b and 32c.

Figure 3B:
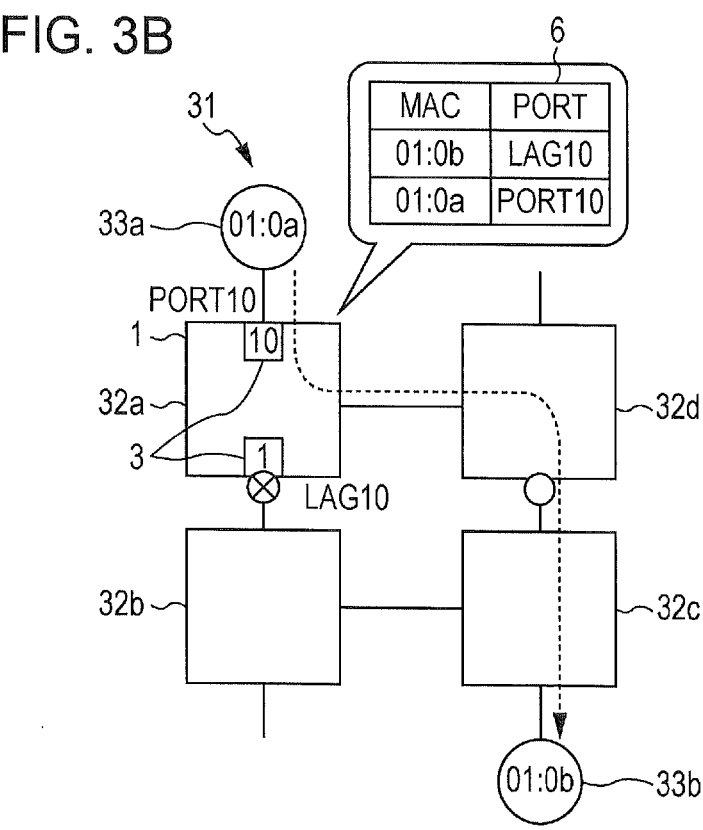
Figure 4A:
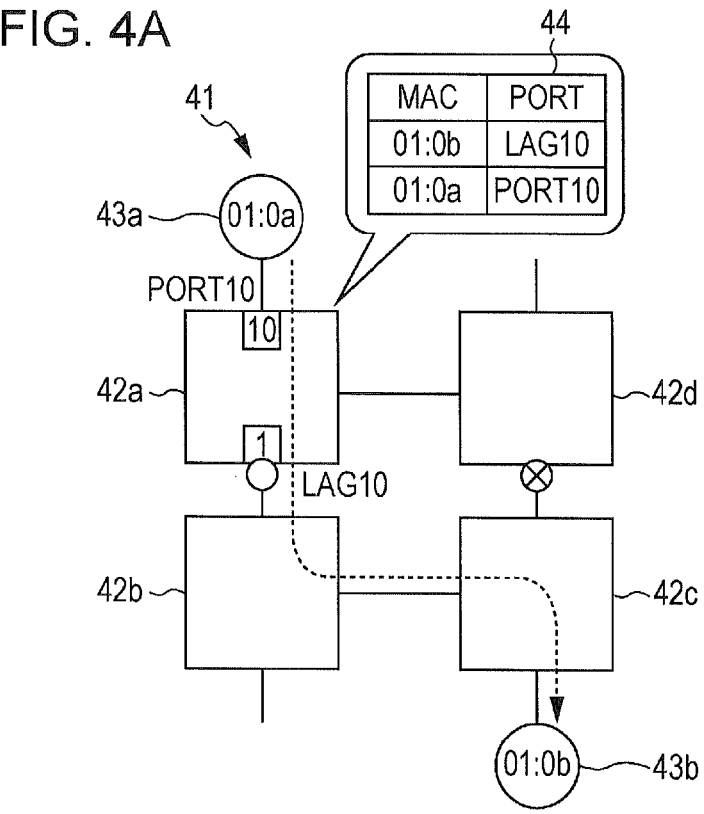
FIGS. 4A and 4B are each a block diagram to explain the operation when a related-art chassis type switch is applied to a ring network.
Figure 4B:
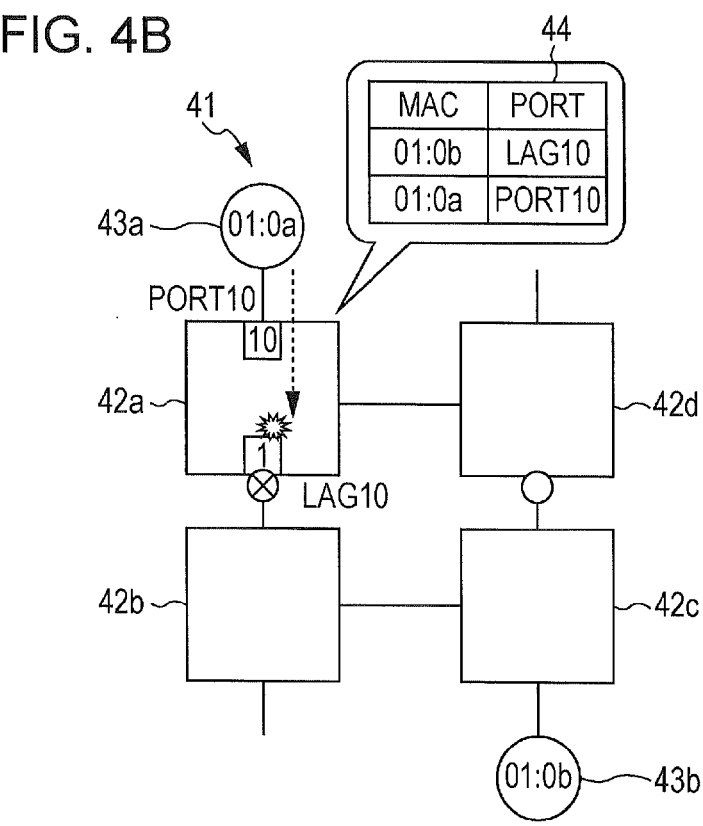

Suppose here that, as illustrated in FIG. 3B, a failure has occurred in the first line card 3 in the chassis type switch 1. The tenth line card 3 detects the failure of the first line card 3 when not receiving the connectivity confirmation frame from the first line card 3 for a predetermined time (3.5 ms in this case). The detection of the failure of the first line card 3 is made substantially at the same time by all the line cards 3 in the chassis type switch 1.

The operation when the unicast frame destined for the terminal 33b from the terminal 33a is received by the tenth line card 3 after detecting the failure of the first line card 3 is as follows.

First, the frame processing unit 4 of the tenth line card 3 refers to the FDB 6 installed therein, and extracts the transfer destination (LAG 10) corresponding to the destination MAC address (01: 0b) of the received frame. Because the transfer destination is the LAG in this case, the frame processing unit 4 further refers to the LAG transfer destination table 7 and extracts the identifier ("first" in this case) of the line card 3 and the identifier of the output port at the transfer destination.

Thereafter, the frame processing unit 4 assigns, to the received frame, the intra-device transfer header including not only the type of the frame, but also the identifier ("first" in this case) of the line card 3 and the identifier of the output port at the transfer destination, and then outputs the frame to the transfer processing unit 5. At that time, because the failure is detected in the first line card 3 at the transfer destination, the forced flooding processing unit 9 forcibly changes the type of the frame in the intra-device transfer header to the destination unknown frame.

With the type of the input frame being the destination unknown frame, the transfer processing unit 5 causes the flooding of the relevant frame. The frame subjected to the flooding reaches the terminal 33*b* through the network relays 32*d* and 32*c*.

In the ring network 31, the presence or the absence of a failure is monitored between the chassis type switch 1 and the network relay 32*d* to each other by employing the ring connectivity confirmation frame. When a failure occurs in the chassis type switch 1, the blocking port of the network relay 32*d* (i.e., the port of the network relay 32*d*, which port is connected to the network relay 32*c*) is immediately made open. At that time, the LAG 10 set for the chassis type switch 1 in which the failure has been detected is brought into the blocking state.

Because control for switching over the port in the blocking state by employing the ring connectivity confirmation frame is a known technique, detailed description of the control is omitted. In brief, assuming that the transmission cycle of the ring connectivity confirmation frame is 3.3 ms, for example, the frame subjected to the flooding in the chassis type switch 1 reaches the network relay 32*d* in the ring network 31, illustrated in FIGS. 3A and 3B, at an earlier timing than the opening of the port in the network relay 32*d*, and some time loss is generated in the network relay 32*d*. However, a time of communication interruption is within 50 ms even in consideration of that time loss as well, and the time of communication interruption can be greatly shortened in comparison with several hundreds milliseconds in the related art.

Thereafter, when the FDB flush is executed with a control frame sent from a management card (not illustrated), the unicast frame destined for the terminal 33*b* from the terminal 33*a* is handled as the destination unknown frame that is not yet learned by the FDB. Thus, the operation shifts to ordinary control. In other words, the process executed in the present invention can be said as a process of forcibly causing the unicast frame, of which communication has been disabled, to be subjected to the flooding in a hardware manner during a time waiting for the process of software, which executes the FDB flush.

As described above, the chassis type switch 1 according to the embodiment includes the failure detection unit 8 for detecting a failure in any of the plural line cards 3, and the forced flooding processing unit 9 included in each of the plural line cards 3 and operating such that when, in trying to transfer a received unicast frame to another line card 3, a failure is detected in the line card 3 at the transfer destination, the received unicast frame is forcibly subjected to the flooding. Accordingly, a time required for the switching-over to the backup route in the event of the failure in the line card 3, i.e., a time of communication interruption, can be greatly shortened in comparison with that in the related art.

Furthermore, in the embodiment, the failure detection unit 8 is included in each of the plural line cards 3 such that the line cards 3 mutually periodically transmit and receive the connectivity confirmation frame among the line cards 3, and that when the connectivity confirmation frame is not received from a certain line card 3 for a predetermined time, the failure detection unit 8 determines that a failure has occurred in the relevant line card 3. As a result, the failure detection can be performed very quickly (e.g., within 3.5 ms), and the switching-over time to the backup route can be further shortened when the failure has occurred in the line card 3. Thus, the time of communication interruption can be greatly shortened, i.e., within 50 ms.

It is a matter of course that the present invention is not limited to the above-described embodiment, and that the present invention can be variously modified without departing from the gist of the invention.

For example, while the failure detection of the line card 3 is performed using the connectivity confirmation frame in the above-described embodiment, the failure detection of the line card 3 may be performed by another specific method.

Moreover, while the failure detection unit 8 is included in each of the plural line cards 3 in the above-described embodiment, the present invention is not limited to that arrangement, and the failure detection unit 8 may be included in the management card as in the related art. In that case, a time taken for each line card 3 to recognize a failure is prolonged, but a time until completion of the FDB flush, which has been essential so far, can be shortened. Thus, the switching-over time to the backup route, i.e., the time of the communication interruption, can be shortened in comparison with that in the related art.

Though not discussed in the foregoing embodiment, the LAG may be set over a plurality of line cards 3. In such a case, when a failure has occurred in any of the plural line cards 3 for which the LAG is set, the failure detection unit 8 regards the occurrence of the failure in any line card as implying that failures have been detected in all of the plural line cards 3 for which the LAG is set. By so regarding, it is possible to prevent the frame from looping and to perform a similar operation to that described above. For example, assuming that the LAG is set for the first to third line cards 3, when a failure has occurred in the first line card 3, the failure detection unit 8 may determine that failures have occurred in the second and third line cards 3 as well, and may cause all unicast frames, which are transferred to the relevant LAG, to be forcibly subjected to the flooding.

What is claimed is:

1. A chassis type switch including a plurality of line cards within a chassis, the switch comprising:

each of plurality of line cards is configured to detect a failure of other line card, wherein said each of plurality of line cards is configured to transmit periodically a connectivity confirmation frame to other line cards, to receive a connectivity confirmation frame transmitted by the other line cards, and to determine that a failure has occurred in a certain line card when the connectivity confirmation frame transmitted by the certain line card is not received for a predetermined time; and a forced flooding processor included in said each of the plurality line cards and operating such that when, in trying to transfer a received unicast frame to other line card, a failure is detected in the other line card at a transfer destination, the received unicast frame is forcibly transferred to all ports of the line card which received the unicast frame other than a reception port thereof and to all other line cards.

2. The chassis type switch according to claim 1, further comprising a frame processing unit included in said each of the plurality of line cards and assigning an intra-device transfer header, including a frame type and an identifier of the line card at the transfer destination, to the received unicast frame; and a transfer processing unit included in said each of the plurality of line cards, transferring a relevant frame to only the line card at the transfer destination when the frame type in the intra-device transfer header is a unicast frame, and transferring the relevant frame to all ports of the line card other than a reception port thereof and to all other line cards when the frame type in the intra-device transfer header is a destination unknown frame, wherein, when a failure is detected in the line card at the transfer destination of the received unicast frame, the forced flooding processing unit forcibly changes the frame type in the intra-device transfer header, which is assigned to the received unicast frame, to the destination unknown frame, thereby forcibly transferring the received unicast frame to all the ports of the line card other than the reception port thereof and to all the other line cards.

3. The chassis type switch according to claim 1, wherein, when an LAG (link aggregation group) is set over a plurality of line cards and when a failure is detected in any of the plural line cards for which the LAG is set, the failure detection unit regards an occurrence of the failure in any line card as implying that failures have been detected in all of the plural line cards for which the LAG is set.

* * * * *